Feb. 16, 1954     A. C. SCHANZ     2,669,015
METHOD OF PROGRESSIVELY WELDING RAILROAD CAR SIDE WALLS
Filed July 31, 1948     10 Sheets-Sheet 1

Inventor
Arthur C. Schanz.

By

George R. Ericson
ATTORNEY

Feb. 16, 1954   A. C. SCHANZ   2,669,015
METHOD OF PROGRESSIVELY WELDING RAILROAD CAR SIDE WALLS
Filed July 31, 1948   10 Sheets-Sheet 2

Inventor.
Arthur C. Schanz.
By George R. Ericson
ATTORNEY

Feb. 16, 1954          A. C. SCHANZ          2,669,015
METHOD OF PROGRESSIVELY WELDING RAILROAD CAR SIDE WALLS
Filed July 31, 1948          10 Sheets-Sheet 4

Feb. 16, 1954 A. C. SCHANZ 2,669,015
METHOD OF PROGRESSIVELY WELDING RAILROAD CAR SIDE WALLS
Filed July 31, 1948 10 Sheets-Sheet 5

Fig. 8.

Inventor
Arthur C. Schanz
By
George R. Ericson
ATTORNEY

Feb. 16, 1954 A. C. SCHANZ 2,669,015
METHOD OF PROGRESSIVELY WELDING RAILROAD CAR SIDE WALLS
Filed July 31, 1948 10 Sheets-Sheet 8

Fig. 12.

Inventor
Arthur C. Schanz

By
George R. Ericson
ATTORNEY

Feb. 16, 1954   A. C. SCHANZ   2,669,015
METHOD OF PROGRESSIVELY WELDING RAILROAD CAR SIDE WALLS
Filed July 31, 1948   10 Sheets-Sheet 9

Fig. 13.

Inventor
Arthur C. Schanz.

By
George R. Ericson
ATTORNEY

Feb. 16, 1954  A. C. SCHANZ  2,669,015
METHOD OF PROGRESSIVELY WELDING RAILROAD CAR SIDE WALLS
Filed July 31, 1948  10 Sheets-Sheet 10

Patented Feb. 16, 1954

2,669,015

UNITED STATES PATENT OFFICE 2,669,015

METHOD OF PROGRESSIVELY WELDING RAILROAD CAR SIDE WALLS

Arthur C. Schanz, Glen Ridge, N. J., assignor to American Car and Foundry Company, New York, N. Y., a corporation of New Jersey Application July 31, 1948, Serial No. 41,834

1 Claim. (Cl. 29—367)

This invention relates to the method of and apparatus for forming units composed of panels and reinforcing elements and more particularly for use as side wall units for railroad cars.

An object of the invention is to provide an economical method of fabricating welded railroad car side units on an assembly line.

Another object of the invention is to provide a method of fabrication by means of which the elements of a railroad car side are progressively assembled and welded together at stations along an assembly line.

Another object of the invention is to provide a jig for welding panels together in which the adjacent edges of the panels are held in definite fixed relation during the welding operation.

Another object of the invention is to provide a welding machine with a pneumatic means for counterbalancing the gantry so that it may be raised and lowered accurately and with minimum effort.

Another object of the invention is to provide a welding machine with mechanism that will accurately raise and lower the gantry.

Another object of the invention is to provide a welding head with dual hold down means for the sides of an element being welded to another.

A further object of the invention is to provide a welding machine in which a movable platen serves the dual purpose of moving welding equipment up and down and at the same time clamping together the elements being welded.

These and other objects of the invention will be apparent to those skilled in the art from a study of the following description and accompanying drawings, in which:

Figure 1:
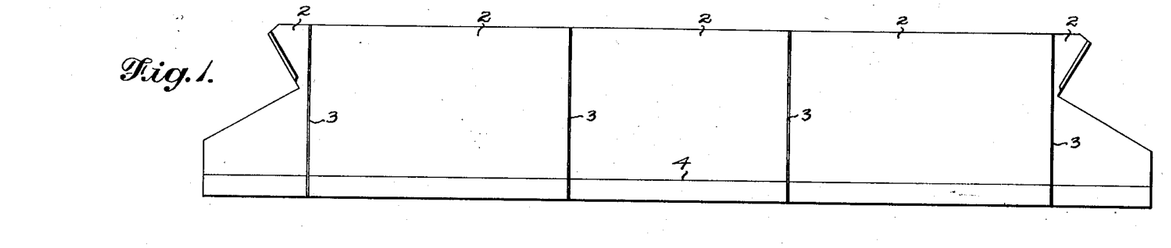
Figure 1 is an upside down side elevational view of a side wall blanket for railroad cars formed of a plurality of welded together panels.
Figure 2:
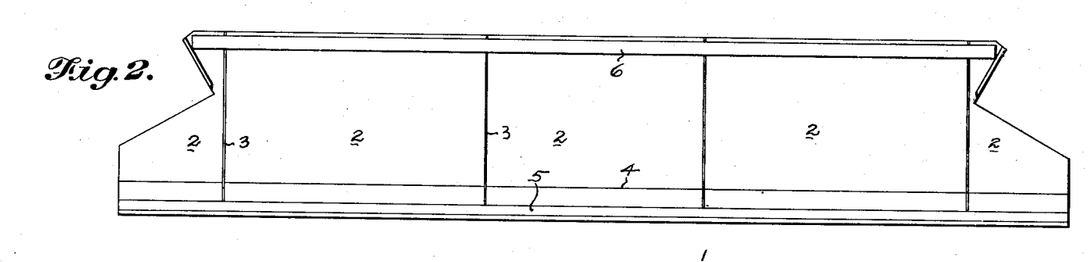
Figure 2 is an upside down side elevational view of the side wall blanket having a bottom side sill welded thereto.
Figure 3:
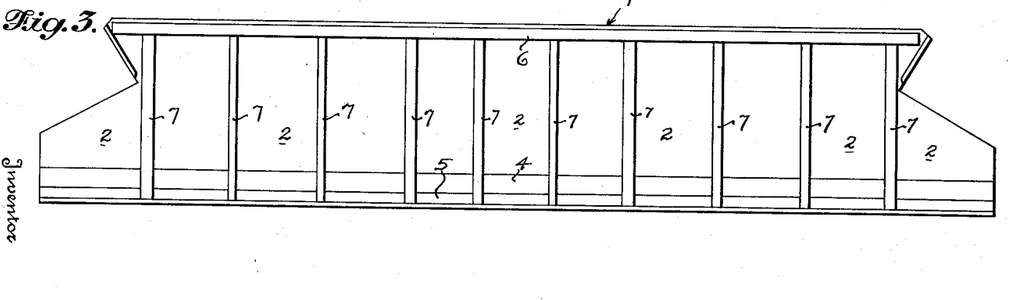
Figure 3 is an upside down side elevational view of a completed side wall unit showing the stakes, top angle plate and bottom side sill welded to the blanket.
Figures 4, 5, 16:
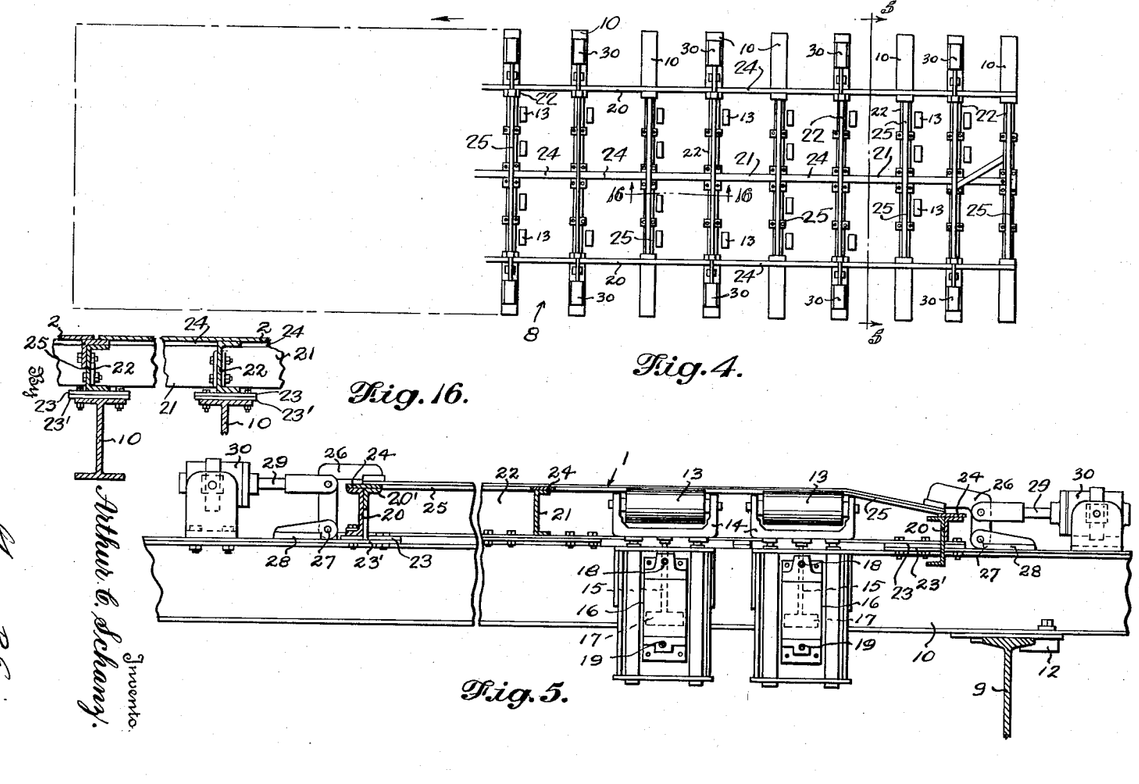
Figure 4 is a plan view of the first portion of a continuous jig.
Figure 5 is a fragmentary sectional view of the jig shown in Figure 4 taken on line 5—5.
Figure 16 is a sectional view of the jig taken on line 16—16 of Figure 4.
Figure 6:
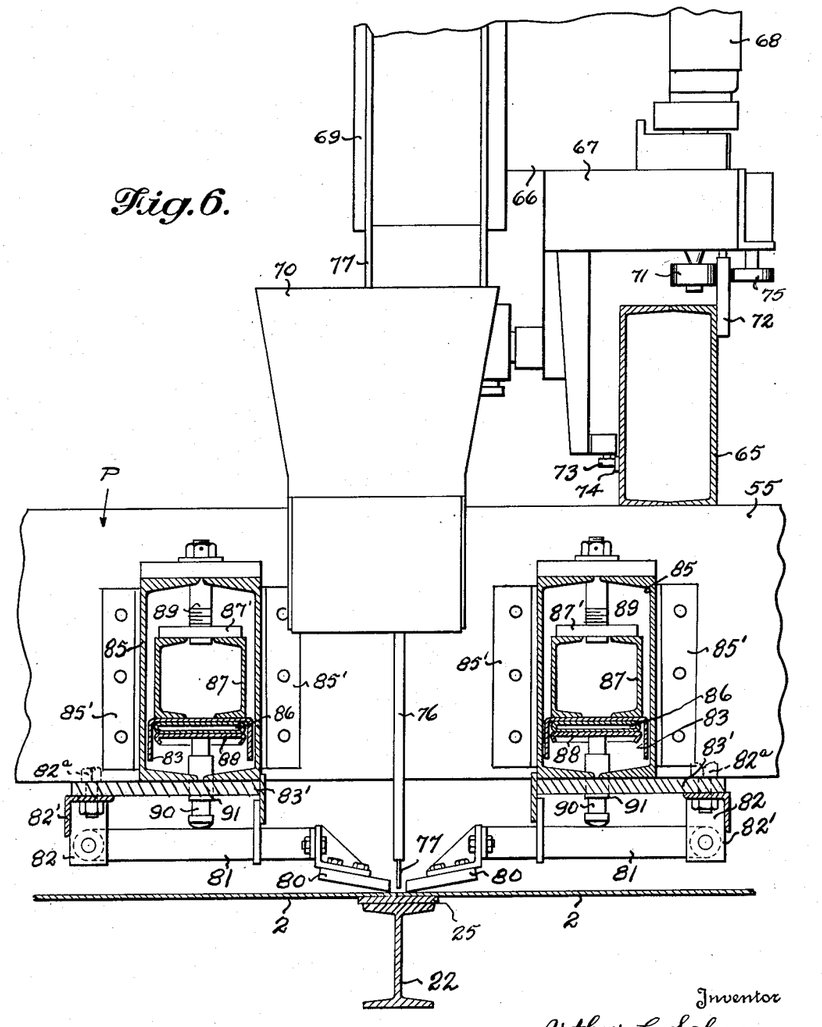
Figure 6 is an enlarged fragmentary vertical sectional view through the first welding machine and jig showing the welding and clamping devices in welding position with the blanket panels.

A permanently assembled side wall unit 1 for a railroad car is shown in Figure 3, the unit being designed for a hopper car for illustration purposes. This unit is composed of a plurality of sheet metal panels 2 welded together along their adjacent edge portions 3 to form a blanket. The upper portion of the blanket is bent to slope inwardly along line 4. To this blanket there is welded a top L-shaped angle plate 5 and a U-shaped bottom sill 6. Stakes 7 are welded to the blanket, the top angle plate and the bottom side sill and are arranged so that they overlie the welds 3. There are also stakes located between the welds 3.

The component parts of the car side unit are welded together at three stations along a continuous assembly line, the assembly line being in the form of a jig 8. Longitudinally extending I beams 9 and transversely extending I beams 10 form the base structure of the jig. Beams 9 are suitably secured to the floor 11 and beams 10 are secured across the tops of beams 9 by clamp means 12 permitting adjustment of beams 10 in a longitudinal direction. Rollers 13 are located adjacent each of the transverse beams and are rotatably mounted on carriers 14 fixed to rods 15 extending into cylinders 16 suitably secured to the adjacent beams 10. Rods 15 extend into the cylinders and have pistons 17 secured thereto. Air under pressure is controlled to flow into the cylinders at either end of the pistons through air hose connections 18 and 19, such hoses being connected with a suitable source of air under pressure and under the control of a manually operable valve. Rollers 13 provide an elevated means for supporting the panel blanket when it is to be moved from one welding station to another, and when such movement is to take place air is admitted into the cylinders to elevate the rollers to a position above a work supporting table mounted on the jig base. After the blanket has reached each welding station the rollers are lowered below the top surface of the supporting table.

Supported on the base of the jig and particularly on beams 10 is table structure which differs slightly at each of the three welding stations to accommodate the location of the weldment.

The table structure consists of longitudinally extending side beams 20, transverse beams 22 extending between and secured to beams 20, and a central longitudinally extending support made up of beams 21 extending between and secured to beams 22. Pads 23 are adjustably secured beneath the beams to pads 23' welded on the tops of transverse base beams 10. Angle members 20' are coextensive with and secured to one side of the longitudinal beams 20 and filler strips 24 are suitably secured across the tops of the beams 20, angle members 20' and intermediate beams 21. Suitably secured on the top of some of the beams 22 at the first welding station and substantially coextensive therewith is an angle member 25 formed of copper. The other beams 22 at this welding station are higher than the copper capped beams so that the top surface thereof is in alignment with the top surface of the copper members 25. The copper members are preferably located in positions where the panels are to be welded together as indicated at 3. It will be noted that the longitudinal beams 20 are adjustable transversely to accommodate different sizes of car side blankets. Along each side of the table at the first welding station are arranged bell crank clamps 26 pivoted at 27 to brackets 28 fixed on beams 10. Control rods 29 are pivoted to the bell crank clamps and terminate in pistons located within cylinders 30 wherein compressed air is supplied to actuate the pistons. The blanket panel sheets 2 are laid sidewise adjacent each other on the jig table and are held by clamps 26 along the top and bottom edges against members 24 on the longitudinal table beams 20 whereupon these component parts are ready for the welding operation to join them together. Such welding is preferably of the submerged arc type.

The welding is done at three stations along the jig line by welding machines 31 having many similar characteristics which will now be described. These machines are mounted on tracks 32 extending outside of the jig and parallel with beams 9 so that the machines can be moved longitudinally at each station for a proper placement with respect to the work to be welded. The gantry is secured on trucks 33 carrying flanged wheels 34 and at each end of each truck is secured a column structure 35 on top of which is mounted a rectangular top framework made up of end girder structures 36 and side girder structures 37. Driving motors 38 are mounted on the columns at one end of the trucks and operate gears 39 meshing with drive gears 40 fixed on axles 41 on which wheels 34 are mounted. Suitable mechanism (not shown) is provided for controlling the motor for driving the welding machine longitudinally with respect to the assembly line jig. Braces 53 reinforce the connections between the top framework and the columns while gusset plates 54 reinforce the corners of the top framework.

A vertically adjustable platen P is carried by the gantry. The platen consists of a rectangular frame having front and rear beams 42 and longitudinal beams 55 extending between columns 35 to which is fixed internally threaded nuts 43 through which elevating screws 44 extend. These screws are anchored at their base portions to the trucks and extend through suitable bearings 45 in the top framework. At the upper ends of the elevating screws are fixed gears 46 meshing with gears 47, and gears 47 are fixed on shafts 48 mounted in suitable bearings in the top framework. Gears 49 on shafts 48 mesh with gears 50 on shaft 51. This shaft is driven by reversible motor 52 which drives belt 53' to rotate jack shaft 54' having a driving connection through chain 60 with shaft 51. The motor is suitably controlled to cause the elevating screws 44 to be rotated in opposite directions and thus the platen may be raised or lowered as desired. The platen carries means for clamping together component parts of the side unit to be welded in close proximity to the lines of weldment. At each corner of the platen there is a shoe 56 having a bearing portion engaging a vertically extending guide rod 57 fixed in each gantry column by means of angle irons 58.

The weight of the platen P is counterbalanced by pneumatic means in order to relieve the pressure on the elevating screws 44 and nuts 43 to thereby reduce to a minimum the power required to raise or lower the platen. This pneumatic means takes the form of two opposite cylinders 59 mounted on the tops of trucks 33 and carrying pistons 61 having rods 62 connected therewith. These rods extend through the tops of the cylinders and are connected with the side beams 55 of the platen. These cylinders have a connection 63 by means of which compressed air can be admitted below the pistons at a desired pressure which normally is approximately the force needed to counterbalance the weight of the platen.

The platen P carries the welding equipment and the means for holding the pieces to be welded together. At the first welding station on the jig assembly line a welding equipment supporting beam 65 extends between and is secured on the tops of longitudinal platen beams 55. The welding equipment carried by beam 65 consists of a head having a base carriage 66, a bottom housing 67, driving motor 68, electrode wire reel 69 and a flux containing hopper 70. The head is driven along the supporting beams 65 by a drive roller 71 rotated by the motor and engaging a rail 72 fixed to the supporting beam 65. The carriage is maintained in position by a guide roller 73 engaging a track 74 on beam 65 and another guide roller 75 engaging the rail 72 on the opposite side from the driving roller 71. Flux tube 76 extends downwardly from the hopper 70 and the electrode wire 77 that is wound around reel 69 projects downwardly through tube 76. The electrode 77 is electrically connected with a suitable welding generator mounted on the upper framework of the gantry. It has been seen that the platen can be adjusted up and down on the gantry and, through a suitable control of motor 68, the electrode carriage can be moved transversely of the jig and the platen to make the weldment 3. The electrode and the flux tube are located by adjustment of the platen, operation of motor 68 and by the position of the gantry on its tracks to place the electrode directly above the abutting ends of the side unit panels 2 at the point where the weld is to be started. Upon operation of motor 68 the welding carriage and electrode will be moved along the junction of the panels 2 until the adjacent edges 3 are welded together, the current being grounded through the copper plate 25 attached to the metallic table and base structure on which the panels are clamped.

The platen P of the welding machine at the first station also carries means for holding the adjacent edges of panels in position for weldment against the copper plates 25. Two series of clamping devices are provided and each series is arranged in rows. Each device consists of a clamp finger 80 fixed on the end of lever 81 that is pivotally mounted on a bracket 82 welded to an angle iron section 82'. These angle iron sections 82' extend transversely between platen beams 55 and are secured by bolts 82ª to supporting plates 83' extending transversely between and secured to the platen beams 55. Outer hollow beams 85 extend transversely between the platen beams 55 and are secured thereto by angle irons 85'. Within each beam 85 and coextensive therewith is arranged a beam 87 having a top plate 87' with which a screw member 89 cooperates to raise and lower the beams 87. These screw members are threaded through the top portion of beams 85. An inverted cup-shaped member 83 is co-extensive with and fixed to the under side of each of the beams 87 and beneath the top of such cup-shaped member and coextensive therewith is arranged an air tube 86. Beneath the air tube and coextensive therewith, within the cup member 83, is an actuator plate 88 with which is engaged a series of plungers 90 extending through guides 91 and engaging levers 81. The tubes have a suitable connection with a source of air under pressure and they will exert a uniform pressure against plungers 90 to thereby exert a similar pressure against the clamping fingers 80 to hold the adjacent edges of panels 2 against the copper plates 25. These clamping devices are fixed to and move with the platen beams 55 so that they are properly located by adjustment of the gantry and the platen. When the adjacent edges of two panels are welded, the gantry is moved along its tracks to the next adjacent edges of panels 2 to be welded and is positioned for such welding operation.

Figure 7:
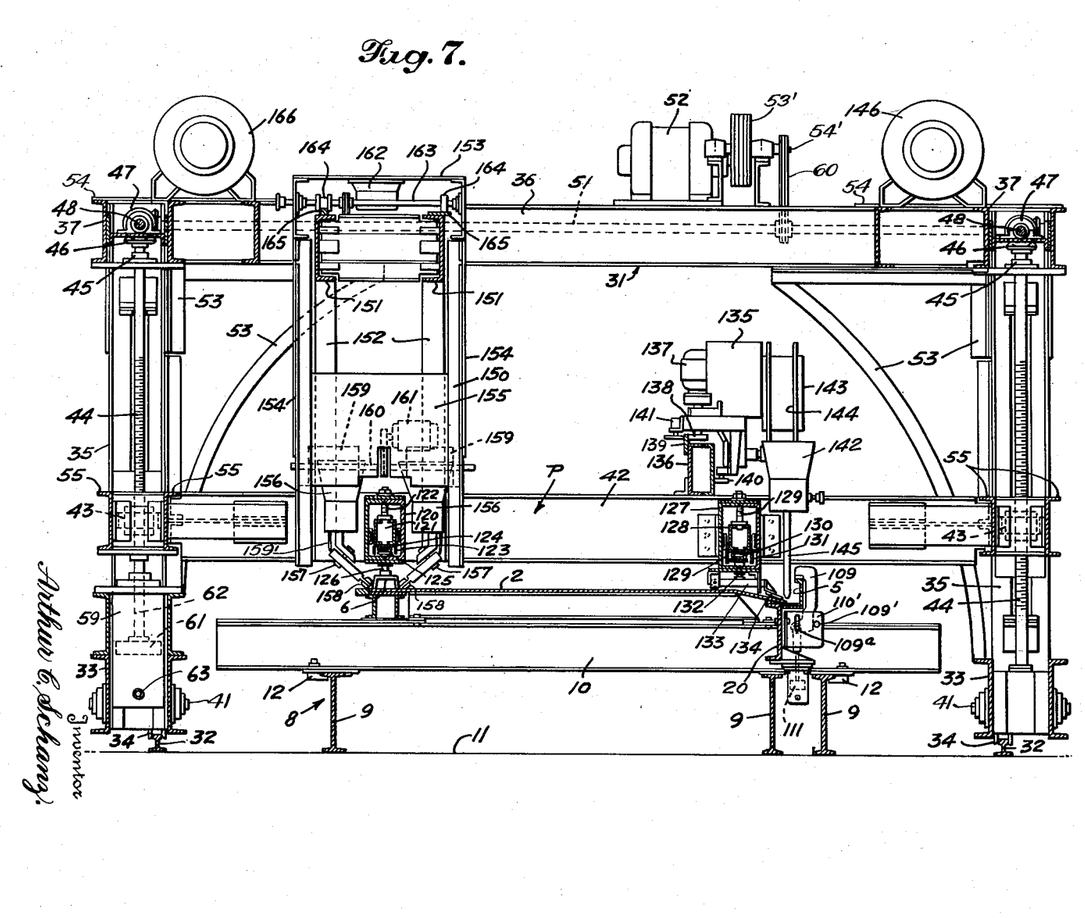
Figure 7 is a sectional view of the second welding machine taken on line 7—7 of Figure 8.
Figure 8:
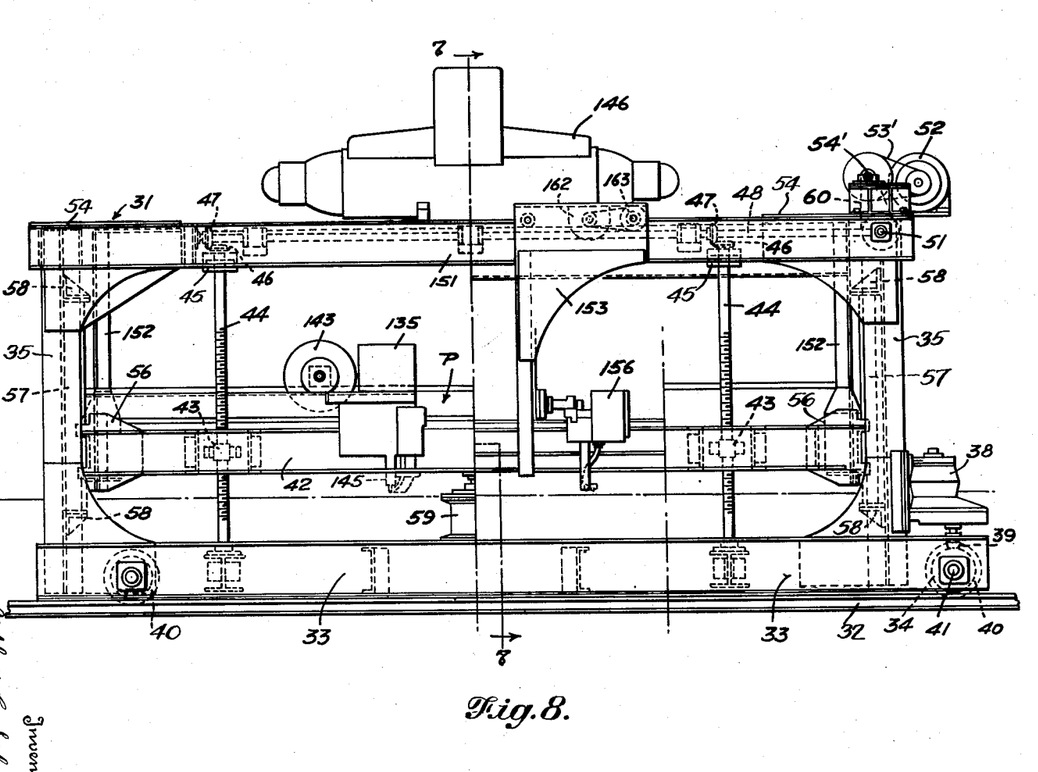
Figure 8 is a side elevational view of the welding machine at the second station.
Figure 9:
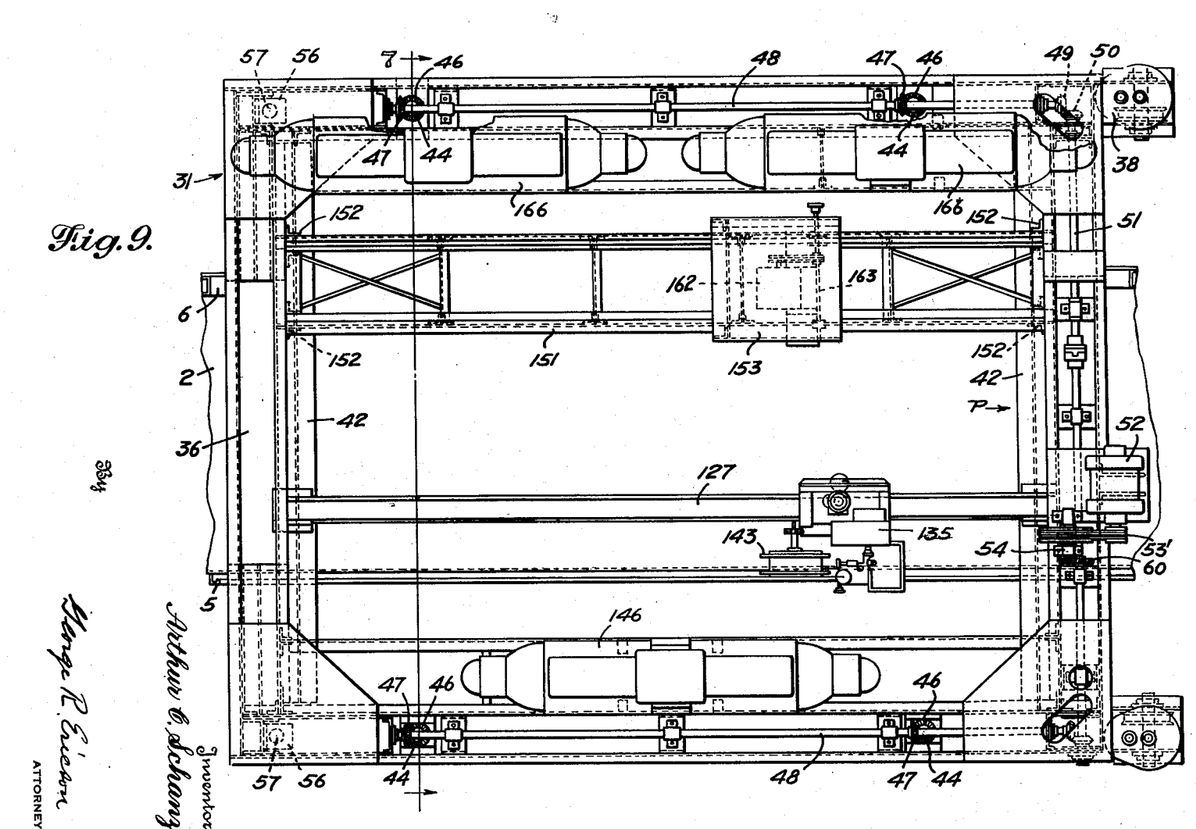
Figure 9 is a plan view of the welding machine at the second station.
Figure 10:
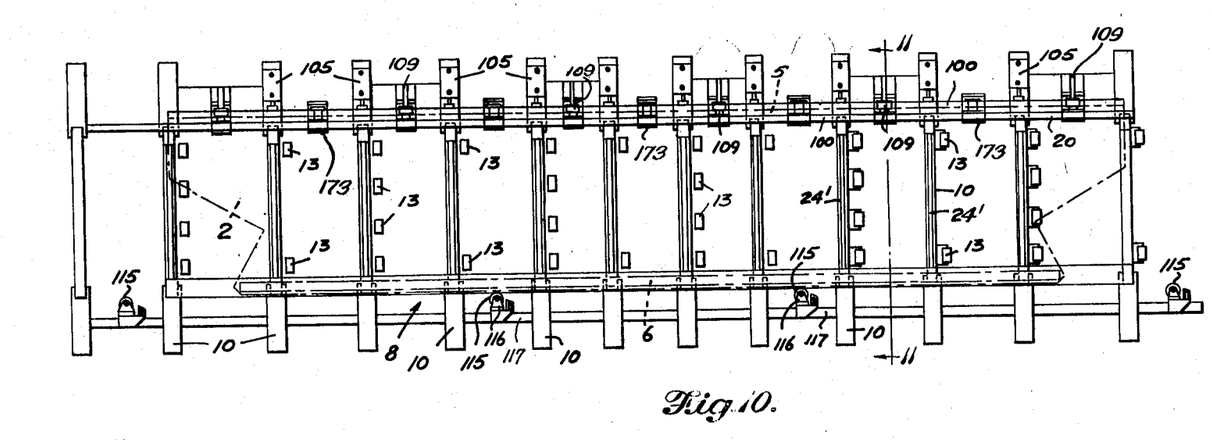
Figure 10 is a plan view of the jig at the second station.
Figure 11:
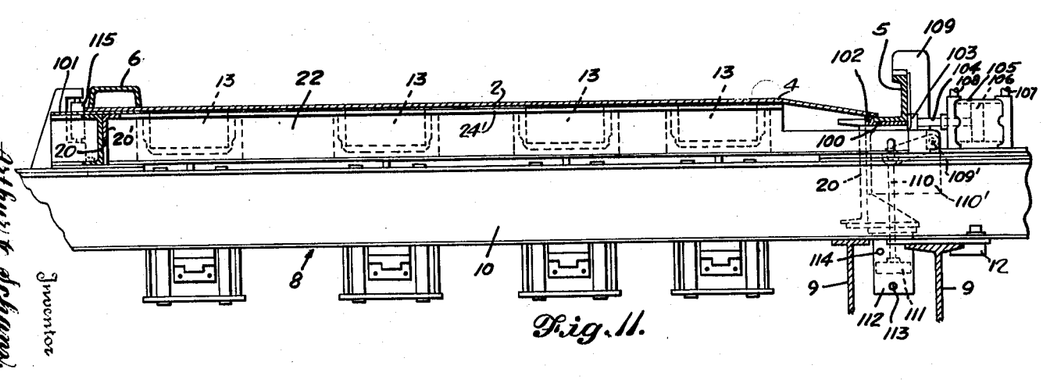
Figure 11 is a fragmentary sectional view of the jig taken on line 11—11 of Figure 10.
Figure 12:
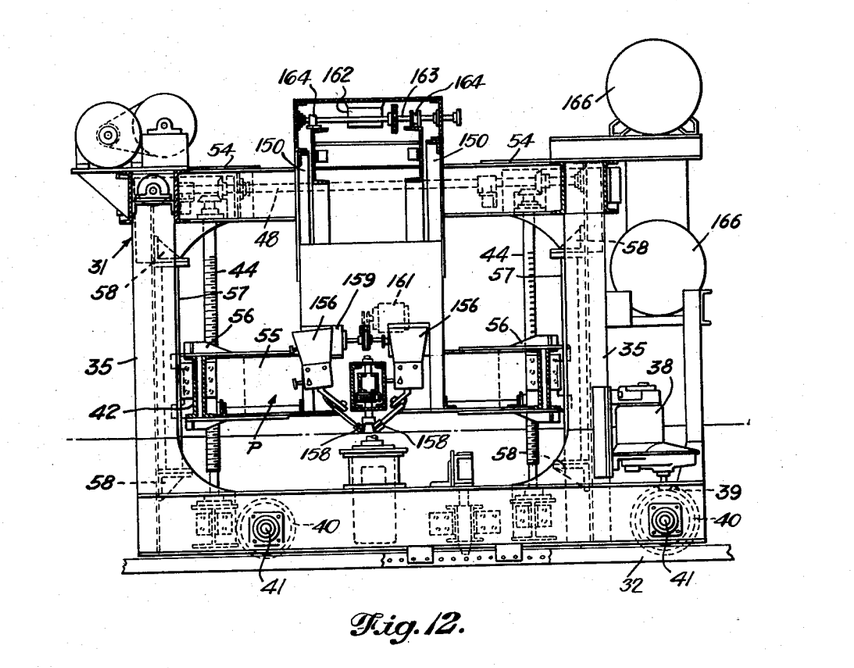
Figure 12 is a front elevational view, partly in section, of the welding machine at the third assembly line station.
Figure 13:
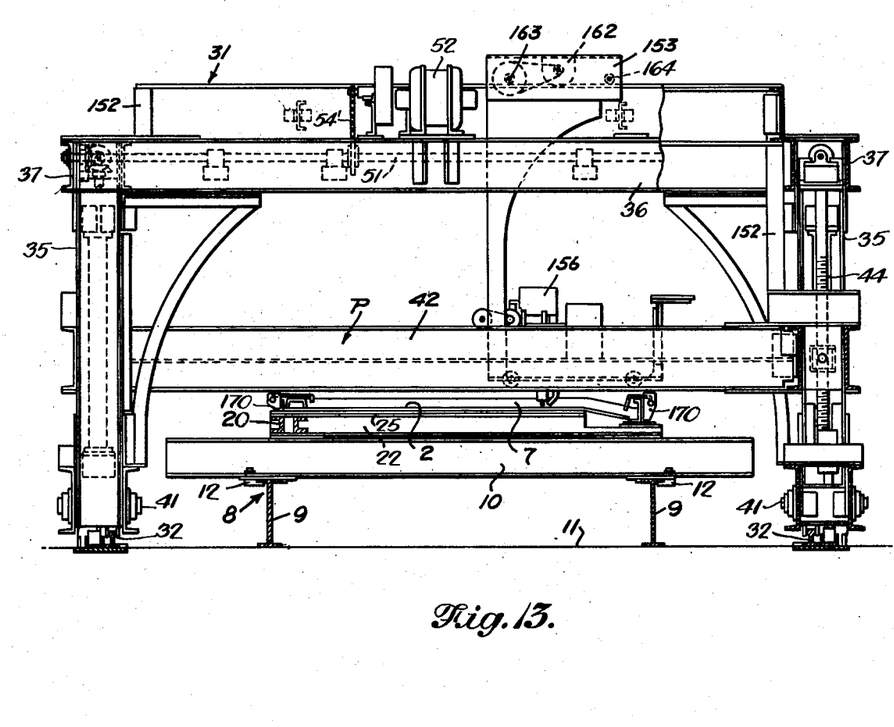
Figure 13 is an end view, partly in section, of the welding machine and jig at the third station in the assembly line.
Figure 14:
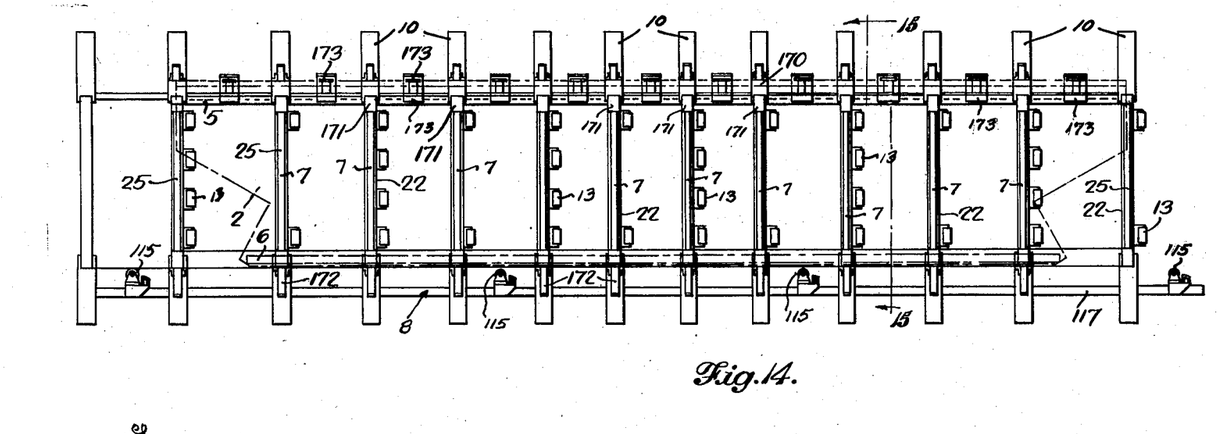
Figure 14 is a plan view of the jig at the third welding station in the assembly line.
Figure 15:
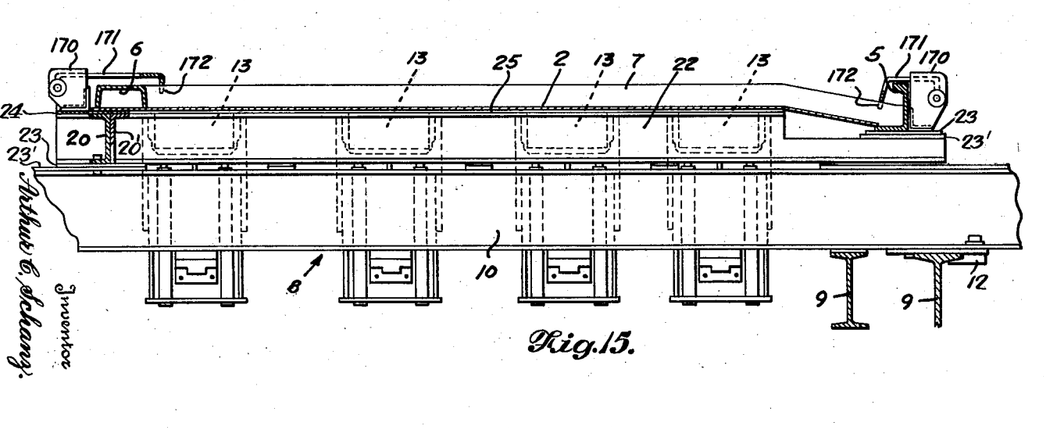
Figure 15 is a fragmentary sectional view of the jig taken on line 15—15 of Figure 14.

After the welding operations have been finished at station one the gantry platen carrying the welding head and the clamps is elevated and rollers 13 are moved upwardly pneumatically to carry the blanket wall consisting of the welded together plates 2 above the level of the jig table at station one whereupon the blanket can be moved down the assembly line table to station two where the top angle plate and bottom side sill are welded to the blanket. The portion of the jig at station two is shown in Figures 7, 10 and 11 and the welding machine employed at this station is shown in Figures 7, 8 and 9.

At the second station in the assembly line the channel or U-shaped bottom sill 6 is placed on the wall blanket adjacent the bottom edge thereof and the top angle plate 5 is placed on the other edge portion of the wall blanket in a direction extending longitudinally of the assembly line jig. At this station the middle beam structure 21 is eliminated and the side table beams 20 and 20' have fastened thereon longitudinally extending copper plates 100 and 101 which form a continuation of similarly located plates 24 at the first jig station. On top of the beams 22 between the copper plates is a filler plate 24'. The wall blanket rests at its ends on the copper plates and along its intermediate portion on the filler plates 24'. Plate 100 has an upstanding lip 102 against which a leg of the top angle plate is positioned and the top edge of the wall blanket projects over the top of a portion of this leg of the top angle plate. The top angle plate is positioned against the lip 102 of the copper plate by a series of clamping heads 103 having rods 104 extending into cylinders 105 fixed on top of the beams 10 and within the cylinders are pistons 106 connected with the rods 104. These cylinders are provided with air connections 107 and 108 that are connected with a source of compressed air whereby the clamping heads 103 can be controlled for release of or to engage and hold the top angle plate in position for welding.

The top angle plate is also held in position by a series of vertical clamps 109 that engage the top of the uppermost leg of the angle plate as located on the jig. These clamps are operated by rods 110 that are connected with pistons 111 operable within cylinders 112. Suitable connections 113 and 114 are associated with the cylinders to admit air under pressure on opposite sides of pistons 111 and in this manner the selection of the air inlet will actuate the bell crank clamps 109 vertically into pressure engagement with the leg of the top angle plate or they will be released from such position. The clamps are guided by pins 109' and the pivotal connection 109ª rides in a slot in bracket 110' fixed to beam 20. The jig is provided with a plurality of rollers 115 for positioning the edge of the blanket adjacent the bottom side sill 6. These rollers are carried by brackets 116 fixed on base members 117 secured between adjacent base beams 10. The table is also provided with rollers 173 on which the panel blanket is supported. The rollers 13 are actuated in the same manner at this station as they were at the first station. During the welding operation the rollers lie below the wall blanket and when the welding operation is completed the rollers are elevated so that the blanket clears the welding table and can be pushed on to the third jig station.

The general characteristics and structure of the welding machine at station two was previously described. As was the case with the welding machine at station one, the platen P of the welding machine at station two carries clamping means and the welding equipment.

The clamping means on the welding machine for the channel bottom side sill at station No. 2 consists of a hollow beam structure 120 having an internal hollow beam structure 121 carried by a screw 122 that is adjustable with respect to beam 120. The beam 120 extends longitudinally of the jig between platen beams 42 and is suitably secured at its ends thereto. A housing 123 is secured to the bottom of beam 120 and encloses a rubber tube 124 bearing against an actuator plate 125 that is coextensive with housing 123. At intervals along beam 120 is arranged clamping heads 126 projecting below beam 120 and bearing against actuator plate 125. These plunger clamps 126 are arranged to bear at intervals against the uppermost base portion of the bottom side sill 6 and a suitable compressed air connection is associated with tube 124 to force the plungers 126 against channel sill member 6 as may be desired to hold it in position during the welding operation.

The top end of the wall blanket is held against the leg of the top angle plate overlying the copper plate 100 by pressure clamping devices similar to those previously described in connection with the hold down means for the adjacent edges of the wall panels at the first station in the assembly line. In the present instance there is a beam 127 extending between platen beams 42 and secured thereto at its ends. This hollow beam 127 encloses a hollow beam 128 supported by a screw member 129 adjustably associated with the top portion of beam 127. Housing 129 is fixed to the bottom of beam 128 and encloses a rubber tubing 130 under which lies an actuator plate 131. This actuator plate operates a series of plungers 132 each of which cooperates with a pivoted lever 133 carrying a clamping finger 134. A suitable compressed air connection is provided for tube 130 so that the plungers can be moved to press the clamp fingers 134 against the top edge of the wall blanket at a desired pressure to hold the top angle plate in position for the welding operation at this station. The gantry at the second station in the assembly line carries a welding head structure 135 which is supported on a hollow beam 136 extending across and fixed to the top portions of platen beams 42. This welding head structure includes a reversible electric motor 137 having a driving roller 138 frictionally engaging a track 139 fixed to the beam 136. The welding head also carries guide rollers 140 and 141. Also associated with this welding head is a flux hopper 142 and a reel 143 for feeding electrode wire 144 that extends through tube 145 which also delivers flux in advance of the electrode. An electric welding generator 146 is suitably connected with the electrode of this welding head 135. This welding head is movable longitudinally of the jig and of the platen when motor 137 is operated as the rotation of roller 138 against the stationary track 139 will cause the welding head carrier to move in a longitudinal direction. Such longitudinal movement of the welding head will cause the electrode to move along the top edge of the wall blanket for welding it to the top angle plate 5.

Another welding head structure 150 is arranged to carry two electrodes for welding the legs of the channel bottom sill 6 to the wall blanket. The welding equipment is mounted on a structure consisting of a rectangular upper framework 151 having legs 152 depending from each corner thereof and such legs are fastened to beams 42 of the platen. A welding equipment carrier structure overlies this supporting structure and is composed of a top rectangular framework 153 and legs 154 that have a carriage 155 fixed thereto. This carriage supports flux hoppers 156 and guide arms 157 at the ends of which are mounted guide rollers 158. Electrode wire reels 159 are also carried by this carriage and the wiring 159' extends downwardly and is suitably located behind the guide rollers 158. The electrode and guide means may be shifted relatively by mechanism that includes a shaft 160 driven from motor 161 mounted on the carriage, such shaft having oppositely disposed worm gears cooperating with means on the hoppers for causing such relative movement of the hoppers to and from each other. This adjustment serves to locate the rollers and the electrodes in the proper position with respect to the lower edges of the bottom legs of the side sill 6. In the upper part of the framework 153 is fixed a reversible motor 162 geared to rotate shaft 163 on which rollers 164 are mounted. This shaft 163 is also rotatably mounted in the upper framework 153 and the rollers 164 frictionally engage track surfaces 165 extending along the top of framework 151. When the motor 162 is driven it will rotate shaft 163 and the rollers 164 fixed thereon will engage the tracks 165 and frictionally drive the carriage member forward or backward between the platen beams 42 whereby the electrodes and guides will be properly placed and operated to weld the bottom side sill to the wall blanket. The gantry is placed in the proper position at station two above the jig assembly line and the platen is lowered to place the electrodes in a desired position at one end of the top angle plate and the bottom side sill. Operation of motors 135 and 162 will cause the welding heads to move along such car side members from one end to the other end. Welding generators 166 are connected in a suitable manner with the dual electrodes to transmit current thereto. The platen is then raised, the clamps released and the rollers 13 elevated whereupon the wall blanket can be pushed on to the third station where the stakes 7 are welded thereon.

After the wall blanket is moved to station three on the jig line, rollers 13 are lowered below the surface of the welding table. At this location the jig has the same base support consisting of beams 9 and 10 and table beams 20 and 22 as previously described, beams 20 having top plates 24 thereon and beams 22 having copper plates thereon in the panel unit where the stakes are to be welded. On the ends of some of the table beams 20 are fixed brackets 170 on which angular spacer arms 171 are pivotally mounted. The free ends 172 of these pivoted spacer arms are formed to straddle stakes 7 and thereby locate them in their proper positions on the wall blanket. No side clamps are required at this station as the panel blanket will be located by brackets 170 on each side of the table.

This station of the jig assembly line employs a series of rollers 173, between the spacer arms, upon which the panel blanket rests. The jig at this station also has the locator rollers 115 as previously described. The welding machine used at the third station for welding the stakes to the wall blanket has generally been heretofore described. In this instance the platen P carries the welding equipment and clamp means for holding the stakes in position during the welding operation. Such welding equipment is of the dual head type described in connection with the welding machine at station two and the clamping means is similar to that described in connection with the machine at station two for holding the bottom side sill in position. The same numerals employed in Figure 7 in describing the welding equipment and the hold down mechanism are used in this instance. At this station the gantry is moved along tracks 32 to the desired position over the blanket as each stake is to be welded, the platen P is lowered to clamp the stake in welding position and to locate the guides and electrodes. Motor 162 is actuated to move the welding head carriage along the edges of the stakes bearing against the side wall blanket in a manner similar to that employed at the first station. This operation is repeated for each position in which the gantry is located for welding the stakes. When the stake welding is completed the platen is elevated and the rollers 13 are elevated whereupon the assembled side wall structure can be rolled on for further treatment.

The invention may be modified in various respects as will occur to those skilled in the art and the exclusive use of all modifications as come

What is claimed is:

The method of progressively fabricating a railroad car side wall which consists of placing a plurality of metal plates in side by side relation on a table at a first station, clamping the plates on the table at the first station with their adjacent sides in abutting relation, welding the abutting side edges of the plates together to form a blanket, unclamping the blanket from the table at the first station, shifting anti-friction elements vertically into engagement with the undersurface of the blanket, elevating the anti-friction elements to raise the blanket out of frictional engagement with elements of the table at the first station, sliding the blanket on the anti-friction elements to a position above a table at a second station, lowering the anti-friction elements at the second station whereby to deposit the blanket on the table at the second station, clamping longitudinally extending reinforcing members, respectively, to each of the longitudinal edges of the blanket, welding the longitudinal members to the blanket whereby to stiffen the blanket longitudinally, shifting anti-friction elements vertically into engagement with the undersurface of the blanket, elevating the anti-friction elements to raise the blanket out of frictional engagement with elements of the table at the second station, sliding the blanket on the anti-friction elements to a position above a table at a third station, lowering anti-friction elements below the level of the table at the third station whereby to deposit the blanket on the table at the third station, applying and clamping transversely extending reinforcing members to the blanket between the longitudinally extending members, and welding the transversely extending members to the blanket while so held thereon.

ARTHUR C. SCHANZ.

References Cited in the file of this patent

UNITED STATES PATENTS

| Number | Name | Date |
|---|---|---|
| 1,648,409 | Kuney | Nov. 8, 1927 |
| 1,772,735 | Romine | Aug. 12, 1930 |
| 2,021,893 | Mitchell | Nov. 26, 1935 |
| 2,139,288 | Shipley | Dec. 6, 1938 |
| 2,140,268 | Moss | Dec. 13, 1938 |
| 2,142,109 | Burke | Jan. 3, 1939 |
| 2,176,664 | Burke | Oct. 17, 1939 |
| 2,301,636 | Nicol | Nov. 10, 1942 |
| 2,314,978 | Gunn | Mar. 30, 1943 |
| 2,379,531 | Lippart | July 3, 1945 |
| 2,444,834 | Landis | July 6, 1948 |
| 2,553,947 | Shipley | May 22, 1951 |

OTHER REFERENCES

Weld. Handbook, 1942 edition, pp. 243–267, published by the Americ. Weld. Society, 33 West 39th St., New York, N. Y. (Copy in Div. 14.)

Amer. Mach., Feb. 12, 1948, p. 121.